United States Patent Office 3,423,429
Patented Jan. 21, 1969

3,423,429
HYDROXYLATED DIEPOXIDES OF ETHER ACETALS OF 1,1-BIS(HYDROXYMETHYL) CYCLOHEXANE
Karl Metzger, Muenchenstein, Daniel Porret, Binningen, and Hans Batzer, Arlesheim, Switzerland, assignors to Ciba Limited, Basel, Switzerland, a Swiss company
No Drawing. Filed Mar. 28, 1966, Ser. No. 537,711
Claims priority, application Switzerland, Apr. 2, 1965, 4,587/65
U.S. Cl. 260—340.7    3 Claims
Int. Cl. C07d 15/04; C08g 30/02, 30/12

ABSTRACT OF THE DISCLOSURE

Diepoxy compounds of the formula (I)

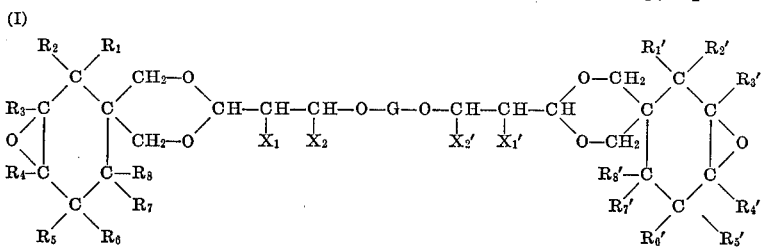

where $R_1$ to $R_8$ and $R_1'$ to $R_8'$ each represents a monovalent substituent such as a halogen atom, an alkoxy group or an aliphatic hydrocarbon residue, preferably a lower alkyl radical containing 1 to 4 carbon atoms, or a hydrogen atom, and $R_1+R_5$ and $R_1'+R_5'$ may also represent an alkylene radical such as a methylene group; $X_1$, $X_1'$, $X_2$ and $X_2'$ each stands for a hydrogen atom or a methyl group, and G for the residue obtained on eliminating two hydroxyl groups from glycerine.

(III)

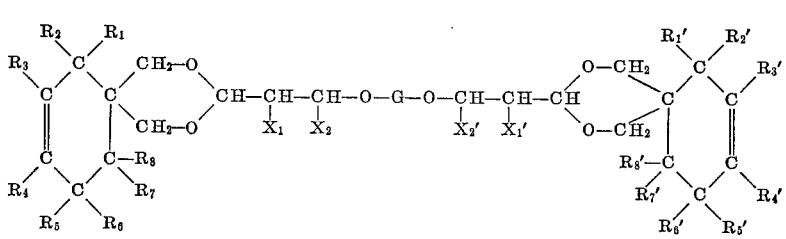

hydroxyl groups from glycerine react with the usual curing agents for epoxy compounds to furnish cured products having improved mechanical properties, especially good elasticity and reduced tendency to develop stress fissures, combined with a good heat distortion point according to Martens (DIN).

The present invention provides new diepoxy compounds of the formula (I)

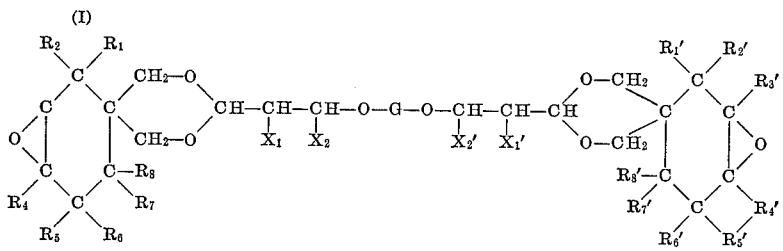

where $R_1$ to $R_8$ and $R_1'$ to $R_8'$ each represents a monovalent substituent such as a halogen atom, an alkoxy group or an aliphatic hydrocarbon residue, preferably a lower alkyl radical containing 1 to 4 carbon atoms, or a hydrogen atom, and $R_1+R_5$ and $R_1'+R_5'$ may also represent an alkylene radical such as a methylene group; $X_1$, $X_1'$, $X_2$ and $X_2'$ each stands for a hydrogen atom or a methyl group, and G for the residue obtained on eliminating two hydroxyl groups from glycerine.

Particularly readily accessible are the diepoxy compounds of the formula (II)

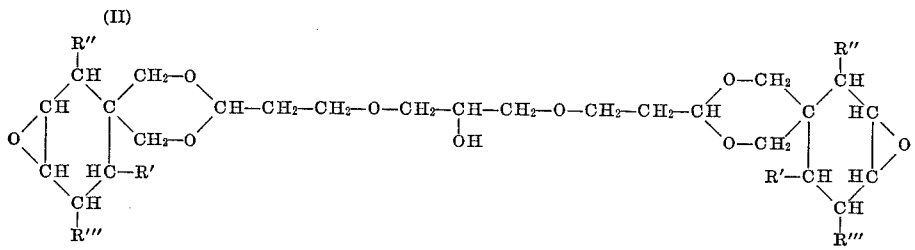

where $R'$ stands for a hydrogen atom or a methyl group and $R''$ and $R'''$ each represents either two hydrogen atoms or together the methylene group.

The new diepoxy compounds of the Formula I or II are obtained by epoxidizing the C=C double bonds in the cyclohexene rings in a compound of the formula (where $R_1$ to $R_8$, $R_1'$ to $R_8'$, $X_1$, $X_1'$, $X_2$, $X_2'$ and G have the same meaning as in Formula I) or in a compound of the formula (IV)

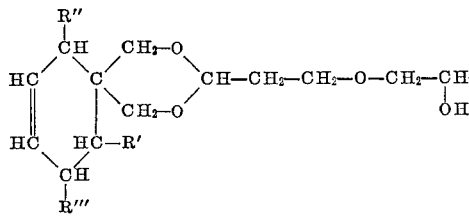

where R', R" and R'" have the same meanings as in Formula II) by treatment with an epoxidizing agent.

The C=C double bond in the cyclohexene ring is epoxidized in the usual manner, preferably with the aid of an organic peracid, such as peracetic acid, perbenzoic, peradipic, monoperphthalic acid or the like, or of a mixture of hydrogen peroxide with an organic acid, such as formic acid, or an acid anhydride such as acetic or succinic anhydride. An alternative epoxidizing agent is hypochlorous acid, in which case in a first stage HOCl is added on to the double bond and in a second stage the epoxide group is formed under the influence of a reagent capable of splitting off HCl, for example strong alkalies.

The starting compounds of the Formulae III and IV in their turn are readily obtained when 2 mols of an acetal of the formula (V)

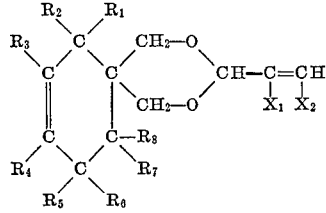

or of the formula (VI)

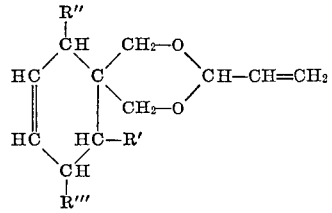

(where the residues $R_1$ to $R_8$, $X_1$, $X_2$, and R' to R'" have the same meanings as in Formula I or II respectively) are added on to 1 mol of glycerine. This additive reaction is advantageously performed in the presence of an acid catalyst or of a Lewis acid, for example of a boron trifluoride complex, such as boron trifluoride diethyl etherate.

The acetals of the Formula V or VI are accessible in the known manner by acetalizing an aldehyde of the Formula VII (VII)

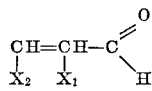

with a dialcohol of the formula (VIII)

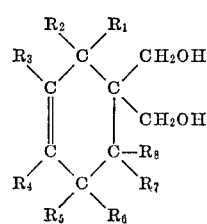

or of the formula (IX)

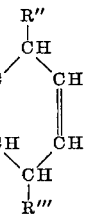

The acetalization may be carried out by known methods, for example by heating the aldehydes of the Formula VIII together with the dialcohol (VIII) or (IX) in the presence of an acid catalyst, for example sulphuric, phosphoric or para-toluenesulphonic acid.

Preferred aldehydes of the Formula VII are acrolein, methacrolein and crotonaldehyde.

Suitable dialcohols of the Formulae VIII and IX are, for example, 1,1-bis(hydroxymethyl)cyclohexene-(3), 1,1-bis(hydroxymethyl) - 6 - methylcyclohexene-(3), 1,1-bis(hydroxymethyl)-2,4,6-trimethyl-cyclohexene-(3), 1,1-bis(hydroxymethyl)-2,5-endomethylene - cyclohexene-(3) and 1,1-bis(hydroxymethyl)-4-chloro-cyclohexene-(3).

The diepoxides of the present invention react with the usual curing agents for epoxy compounds. Therefore, by addition of such curing agents they can be cross-linked or cured like other polyfunctional epoxy compounds or epoxy resins. As such curing agents there are suitable basic or especially acidic compounds.

The following curing agents have proved suitable: Amines or amides, such as aliphatic or aromatic primary, secondary and tertiary amines, for example para-phenylenediamine, bis(para-aminophenyl)methane, ethylenediamine, N,N-diethylethylenediamine, diethylenetriamine, tetra(hydroxyethyl)diethylenetriamine, triethylenetetramine, N,N-dimethylpropylenediamine, Mannich's bases such as tris(dimethylaminomethyl)phenol; dicyandiamide, urea-formaldehyde resins, melamine-formaldehyde resins; polyamides, for example those from aliphatic polyamines and dimerized or trimerized unsaturated fatty acids; polyhydric phenols, for example resorcinol, bis(4-hydroxyphenyl)dimethylmethane, phenol - formaldehyde resins, reaction products of aluminum alcoholates or phenolates with compounds of tautomeric reaction of the acetoacetic ester type; Friedel-Crafts catalysts, for example aluminium chloride, antimony pentachloride, tin tetrachloride, zinc chloride, boron trifluoride and their complexes with organic compounds, such, for example, as $BF_3$-amine complexes, metal fluoborates such as zinc fluoborate; phosphoric acid; or boroxines such as trimethoxyboroxine.

Preferred curing agents are polybasic carboxylic acids and their anhydrides, for example phthalic, tetrahydrophthalic, hexahydrophthalic, methylhexahydrophthalic, endomethylene - tetrahydrophthalic, methyl - endomethylene-tetrahydrophthalic anhydride (=methyl nadic anhydride), hexachloro - endomethylene - tetrahydrophthalic, succinic, adipic, maleic, allylsuccinic, dodecenylsuccinic acid anhydride; 7-allyl-bicyclo(2.2.1)hept-5-ene-2,3-dicarboxylic acid anhydride, pyromellitic acid dianhydride or mixtures of such anhydrides. Preferably used curing agents are those which are liquid at room temperature.

If desired, there may be additionally used an accelerator such as a tertiary amine or a salt or quarternary ammonium compound for example tris(dimethylaminomethyl)phenol, benzyldimethylamine or benzyldimethyl ammonium phenolate, a stannous salt of a carboxylic acid, such as stannous octoate, or an alkali metal alcoholate, for example sodium hexylate.

As a rule, however, such an accelerator need not be used additionally, and this is a special advantage of the new diepoxides of this invention over most of the known cycloaliphatic diepoxides.

Unexpectedly, the curing of the new diepoxides with anhydride curing agents alone furnishes cured products having improved mechanical properties, especially good elasticity and reduced tendency to develop stress fissures, combined with a good heat distortion point according to Martens (DIN), compared with what is achieved by curing a known cycloaliphatic polyepoxide with an anhydride curing system accelerated by compounds containing hydroxyl groups.

The curing of the diepoxides of this invention with anhydrides is advantageously carried out with 0.5 to 1.1 gram equivalent of anhydride groups for every gram equivalent of epoxide groups.

Optimal properties of the cured products are generally achieved by using 1 equivalent of anhydride groups for every equivalent of epoxide groups. However, when an accelerator containing hydroxyl groups is additionally used, it is advantageous to increase the amount of the anhydride curing agent added.

The term "curing" as used in this context describes the conversion of the afore-mentioned diepoxides into insoluble and infusible cross-linked products, generally combined with a shaping operation to yield shaped products such as castings, mouldings or laminates or flat materials, such as lacquer films or cemented articles.

As a rule, the new diepoxy compounds are liquid to viscous resins. For further reducing the viscosity there may, if desired, be added so-called active diluents, such as butyl glycide, cresyl glycide or 3-vinyl-2,4-dioxaspiro (5,5)-9,10-epoxy-undecane. The new diepoxides may also be added as so-called upgraders to other known epoxy resins to produce a favourable influence on the mechanical properties in the cured state.

As other diepoxy or polyepoxy compounds, which may be used in conjunction with the diepoxides of this invention, there my be mentioned, for example, polyglycidyl ethers of polyhydric alcohols or especially of polyhydric phenols, such as resorcinol, bis(4-hydroxyphenyl) dimethylmethane (=bisphenol A) or condensation products of formaldehyde with phenols (novolaks); polyglycidyl esters of polycarboxylic acids, for example phthalic acid; aminopolyepoxides obtained by dehydrohalogenation of the reaction products of epihalohydrin with primary or secondary amines such as aniline or 4,4'-diaminodiphenylmethane; also alicyclic compounds containing several epoxide groups, such as vinylcyclohexene dioxide, dicyclopentadiene diepoxide, ethyleneglycol-bis-(3,4 - epoxy - tetrahydrodicyclopentadien-8-yl)ether, 3,4-epoxytetrahydrodicyclopentadienyl-8-glycidyl ether, (3',4'-epoxy-cyclohexylmethyl)-3,4-epoxy-cyclohexane carboxylate, (3',4'-epoxy-6'-methylcyclohexylmethyl)-3,4-epoxy-6-methyl-cyclohexane carboxylate, bis(cyclopentyl)ether diepoxide or 3,4-epoxy-hexahydrobenzal(3,3-epoxy-cyclo-hexane-1,1-dimethanol). Preferred use is made of polyepoxides that are liquid at room temperature.

Accordingly, the present invention includes also curable mixtures that contain the diepoxides of this invention, if desired in combination with other diepoxy or polyepoxy compounds and furthermore curing agents for epoxy resins preferably anhydrides of dicarboxylic or polycarboxylic acids.

The diepoxy compounds of this invention, and their mixtures with polyepoxy compounds and/or curing agents may also be admixed at any stage before the curing operation with fillers, plasticizers, pigments, dyestuffs, flame-inhibitors or mould lubricants.

Suitable extenders and fillers are, for example, asphalt, bitumen, glass fibres, cellulose, mica, quartz powder, aluminium hydroxide, gypsum, kaolin, ground dolomite, colloidal silica having a large specific surface (Aerosil) or metal powders, such as aluminium powder.

The curable mixtures may be used without or with fillers if desired in the form of solutions or emulsions, as textile adjuvants, coating compositions, laminating resins, paints, lacquers, dipping resins, casting resins, moulding compositions, pore fillers and putties, floor coverings, potting and insulating compositions for the electrical industry, adhesives, and for the manufacture of such products.

They are used with special advantage where there is a great risk of stress fissuring, such as in grouting large metal components, for example for potting transformer coils.

Percentages in the following examples are by weight.

EXAMPLE 1

(a) Acetal from acrolein and 1,1-bis-(hydroxymethyl)-cyclohexene-3.—A mixture of 118 g. of acrolein, 286 parts of 1,1-bis(hydroxymethyl)cyclohexene-3 and 3 ml. of sulphuric acid of 50% strength is heated for 20 minutes at 50° C. When all has dissolved, 700 ml. of benzene and 2 g. of para-toulenesulphonic acid are added and the batch is boiled for 40 minutes in a circulating distillation apparatus until 40 g. of water have been removed azeotropically. The solution is mixed with 4 g. of anhydrous sodium carbonate, filtered and evaporated. After the benzene has been expelled, there pass over at 54 to 61° C. under a vacuum of 0.2 mm. Hg 319 g. of acetal (3-vinyl-2,4-dioxaspiro(5.5)undecene-9), corresponding to a yield of 87% of the theoretical.

(b) Additive reaction with glycerine.—A mixture of 138 g. of glycerine and 5 ml. of boron trifluoride diethyl etherate is charged into a reactor equipped with agitator, thermometer, reflux condenser and dropping funnel and heated to 120- C. In the course of 2 hours, 540 g. of the acetal (3-vinpl-2,4-dioxaspiro(5.5)undecene-9) described above under (a) are dopped in, while maintaining the temperature at 120° C. by moderate cooling. The batch is allowed to react further for about 2½ hours at 120- C., during which the drop in the hydroxyl content is checked by taking specimens and acetylating them with acetic anhydride in pyridine. The viscous, brown reaction product is dissolved in 1500 g. of ethyl acetate, the catalyst washed out with 200 g. of 10% aqueous sodium carbonate solution, the solution washed neutral with 200 g. of monosodium phosphate solution (140 g./litre), separated and dried over anhydrous sodium sulphate. On removal of the solvent there are obtained 766 g. (=94.5% of theory) of a product which consists substantially of the di-adduct of the formula

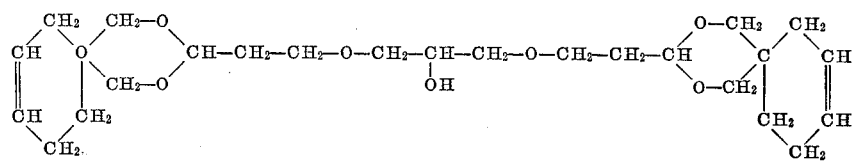

*Analysis* (after drying for 2 hours at 80° C. under 0.2 mm. Hg).—Calculated: C, 66.59%, H, 8.98%. Found: C, 66.34%; H, 8.91%.

The hydroxyl content is 235 equivalents of OH groups per kg. (Theoretical values: for the diadduct=2.21 equivalents OH/kg.; for the monoadduct=7.35 equivalents OH/kg.)

(c) *Epoxidation.*—For epoxidation there may be used the solution (washed until neutral) of the diadduct in ethyl acetate described under (b) above as it is, or else 760 g. of the diadduct are dissolved in 2300 g. of ethyl acetate and this solution is heated to 45° C., maintaining this temperature during the whole reaction time. In the course of one hour the equivalent to 755 g. (=20% excess) of 100% peracetic acid in the form of an aqueous solution is continuously added while cooling. In the present example 285 g. of an aqueous peracetic acid solution containing 6.84 mols of peracetic acid per kg. (=51.9%) were added. By simultaneous addition of 17.5% aqueous sodium carbonate solution the pH of the reaction mixture is maintained at 5.0. The progress of the reaction is checked by iodometric titration of the peraceic acid in periodically taken specimens. Thus, after 1.5 hours after-reacton time 77.1%, after 2.5 hours 86.5% and after 4 hours 91.2% of the theoretical amount of peracetic acid had been consumed, whereupon the experiment was discontinued.

For working up the reaction mixture it is cooled with ice and the acetic acid formed neutralized with 600 g. of sodium hydroxide solution of 30% strength. The two phases are separated in a separating funnel. The aqueous phase and the washings are once more extracted with ethyl acetate in a second separating funnel, and the extract is then washed once with 100 g. of 2 N-sodium carbonate solution, once with 50 g. of a 10% aqueous monosodium phosphate solution and once more with 200 ml. of water. The solution is dried over anhydrous sodium sulphate, filtered and concentrated under vacuum. The readily volatile material is expelled by heating for 3 hours at 100° C. under 0.1 mm. Hg pressure, to yield 726 g. (=89.3% of the theoretical yield) of a yellow, viscous resin (=Epoxy resin A) containing 3.23 epoxide equivalent per kg. (=78.2% of theory)). The resin consists predominantly of the diepoxide of the formula

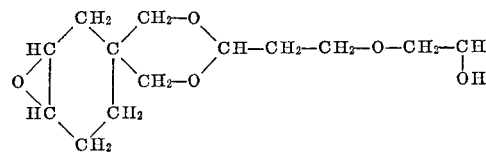

The epoxide yield can be increased by suitable variation of the reaction conditions. The following tests 1 to 4 were carried out with 55.2% peracetic acid at 50° C., using different after-reaction times, but otherwise the reaction conditions were as described above. The following table shows the properties of the epoxy resins obtained:

| Test | After-reaction time, hours | Epoxide content of the resin | | Viscosity of the resin in centipoises at 25° C. |
|---|---|---|---|---|
| | | Epoxide equivalents per kg. | Percent of theory | |
| 1 | 3 | 3.58 | 86.5 | 431,000 |
| 2 | 6½ | 3.71 | 89.5 | 500,000 |
| 3 | 8 | 3.72 | 90 | 537,000 |
| 4 | 12 | 3.70 | 89 | 633,000 |

EXAMPLE 2

(a) *Acetal from acrolein and 1,1-bis(hydroxymethyl)-6-methyl-cyclohexane-3.*—A mixture of 356 g. of acrolein, 936 g. of 1,1-bis(hydroxymethyl)-6-methyl-cyclohexene-3, 5 ml. of boron trifluoride diethyl etherate and 2100 ml. of anhydrous benzene is heated in a circulating distillation apparatus until about 100 ml. of water have separated azeotropically, which takes about 3 hours. The cooled reaction mixture is washed once with 50 ml. of 10% sodium carbonate solution and once with 50 ml. of monosodium phosphate solution (140 g./litre), dried over anhydrous sodium sulphate, filtered and concentrated in a rotary evaporator. The residue is distilled under a high vacuum over a Vigreux column. The main acetal fraction boils at 67 to 68.5° C. under 0.3 mm. Hg pressure and reveals a refractive index $n_d^{20}$ of 1.4920. The yield is 1006 g., corresponding to 86% of the theoretical.

*Analysis.*—Calculated: C, 74.09%; H, 9.38%; O, 16.70%. Found: C, 74.19%; H, 9.34%; O, 16.47%.

(b) *Additive reaction with grycerine.*—A mixture of 184 g. of glycerine, 5.0 ml. of boron trifluoride diethyl etherate and 776 g. of the acetal, described above under (a), from acrolein and 1,1-bis(hydroxymethyl)-6-methyl-cyclohexene-3 is treated as described in Example 1(b). After a total reaction time of 6.5 hours the batch is worked up as described in Example 1(b), to yield 912 g. (=95% of theory) of a reddish, viscous product containing 2.74 hydroxyl groups per kg., which consists essentially of the di-adduct of the formula

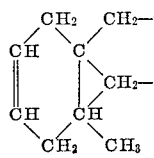 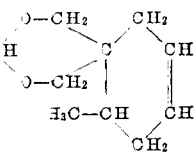

(c) *Epoxidation.*—The epoxidation is carried out as described in Example 1(c). 907 grams of the di-adduct described above under (b) are dissolved in 2700 g. of ethyl acetate, heated to 45° C., and reacted with 800 g. of peracetic acid containing 5.67 mols of pure peracetic acid per kg. (=43.1%). This amount corresponds to an excess of 20% of peracetic acid. After a reaction time of 7 hours at 45° C. the batch is worked up, to yield on removal of the last remnants of the solvent (after heating for 2.5 hours at 90° C. under 1 mm. Hg pressure) 872 g. (=90.5% of theory) of a yellow, highly viscous resin containing 2.52 epoxide equivalents per kg.

EXAMPLE 3

The epoxy resin A (prepared as described in Example

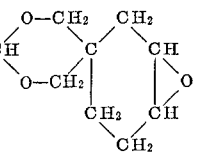

1 by epoxidation with 51.9% peracetic acid with an after-reaction time of 4 hours at 45° C.; containing 3.23 epoxide equivalents per kg.) was mixed in Tests 1, 2 and 3 with 0.85, 1.0 and 1.1 equivalents of hexahydrophthalic anhydride per 1 equivalent of epoxide groups, while being heated until a homogeneous mass had been formed and the mixtures were then poured into siliconized aluminium tubes. Curing was carried out for 2 hours at 120° C. and then for 14 hours at 140° C.

In further Tests 4 and 5 epoxy resin A was fused with 0.45 and 0.60 equivalent of phthalic anhydride for every epoxide equivalent with heating, poured into aluminium tubes and cured for 4 hours at 120° C., then for 14 hours at 150° C. and finally for 5 hours at 190° C.

The properties of the cured castings are listed in the following table:

| Test | 1 | 2 | 3 | 4 | 5 |
|---|---|---|---|---|---|
| Ratio equivalent anhydride groups to equivalent epoxide groups | 0.85 | 1.0 | 1.1 | 0.45 | 0.60 |
| Heat distortion point accdg. to Martens (DIN), in °C | 107 | 112 | 113 | 112 | 110 |
| Deflection in mm.[1] | 10.0 | 11.4 | 10.2 | 13.1 | 11.9 |
| Flexural strength (VSM), in kg./sq. mm | 13.2 | 15.0 | 13.1 | 15.5 | 15.1 |
| Impact strength (VSM), in cm.-kg./sq. cm | 13.5 | 14.8 | 10.0 | 10.7 | 10.0 |
| Water absorption, after 4 days at 20° C., in percent | 0.69 | 0.65 | 0.61 | 1.05 | 0.93 |

[1] Deflection measured in mm., in the bending test according to VSM, dimensions of test bar: 60 x 10 x 4 mm.

For comparison with the epoxy resin A of this invention, described in Example 1, symmetrical diepoxy compounds were prepared by adding 2 mols of 3-vinyl-2,4-dioxaspiro(5.5)-undecene-9 on to 1 mole each of the following glycols or polyols:

(b) 1,2-propanediol
(c) 2,3-butanediol
(d) 1,3-butanediol
(e) polypropyleneglycol, average molecular weight 150
(f) trimethylolpropane, followed by epoxidation of the di-adduct obtained. The addition of 3-vinyl-2,4-dioxaspiro(5.5)undecene-9 on to the glycol or polyol was carried out exactly as described in Example 1(b), except that instead of glycerol an equivalent amount of one of the polyols (b) to (f) was used. The resulting di-adduct was epoxidized exactly as described in Example 1(c).

In the manner described above, the following epoxy resins (B) to (F) were obtained; the characterizing capital letters of these epoxy resins correspond to the lower-case letters (b) to (f) of the above-mentioned polyols from which the individual epoxy resins are derived From epoxy resins (B) to (F) casting resin specimens 6 to 10 were prepared by mixing with 1.0 equivalent of hexahydrophthalic anhydride for every epoxide equivalent. Furthermore, there were added to the casting resin specimens with epoxy resins (B) to (E), whose molecule contains no hydroxyl groups, for every kg. of epoxy resin 60 g. of an accelerator containing hydroxyl groups (obtained by reacting 8.2 g. of sodium with 1 kg. of 3-hydroxymethyl-2,4-dihydroxypentane) to ensure good curing right through.

The castings 6 to 10 were each cured for 4 hours at 120° C. and then for 14 hours at 140° C. These curing conditions imparted optimal mechanical properties to the castings.

The properties of the cured castings are shown in the following table:

| | Test | | | | |
|---|---|---|---|---|---|
| | 6 | 7 | 8 | 9 | 10 |
| | Epoxy resin | | | | |
| | B | C | D | E | F |
| Epoxide equivalents per kg | 3.6 | 3.7 | 3.6 | 3.1 | 3.2 |
| Ratio equivalents anhydride groups to equiv. epoxide groups | 1.0 | 1.0 | 1.0 | 1.0 | 1.0 |
| G. of accelerator per kg. of epoxy resin | 60 | 60 | 60 | 60 | ----- |
| Heat distortion point accdg. to Martens (DIN), in °C | 89 | 92 | 86 | 62 | 93 |
| Deflection (VSM), in mm.[1] | 6.4 | 7.5 | 5.1 | 13.6 | 8.8 |
| Flexural strength (VSM), kg./mm.[2] | 11.6 | 10.2 | 10.8 | 10.9 | 13.6 |
| Impact strength (VSM), cm. kg. cm.[2] | 11.8 | 8.2 | 9.7 | 15.5 | 6.6 |
| Water absorption after 4 days at 20° C. in percent | 0.53 | 0.53 | 0.49 | 0.61 | 0.37 |

[1] Deflection in mm. measured by the VSM bending test; test bar measures 60 x 10 x 4 mm.

The comparative tests reveal that the cured castings with epoxy resins B to F produce under optimal curing conditions lower test values than the epoxy resin A of (B)
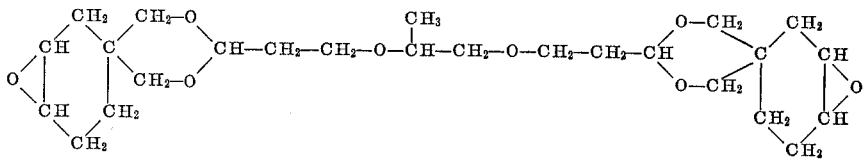

(C)
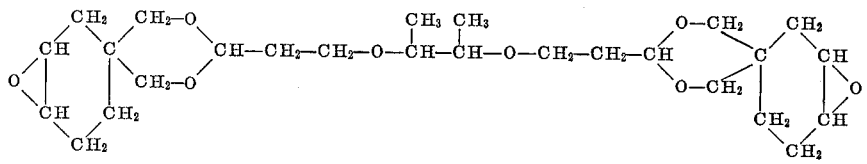

(D)
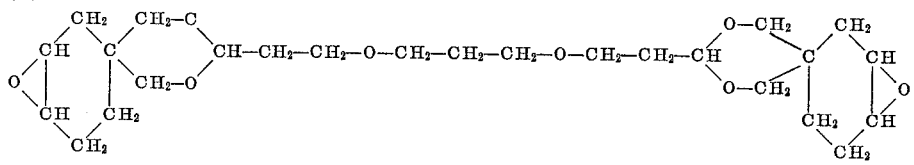

(E)
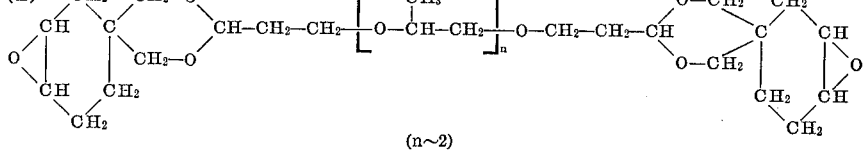
(n~2)

(F)
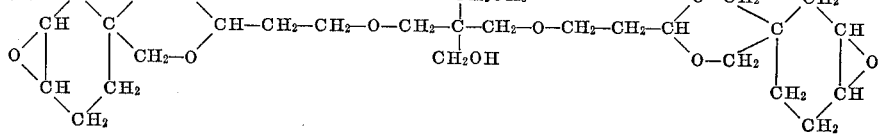

this invention; above all, they produce lower heat distortion points according to Martens (DIN).

EXAMPLE 4

The epoxy resin produced as described in Example 2 by epoxidation with 43.1% peracetic acid and 7 hours' after-reaction at 45° C., containing 2.52 epoxide equivalents per kg., was mixed in Tests 1, 2 and 3 with 0.85, 1.0 and 1.1 equivalents of hexahydrophthalic anhydride for every epoxide equivalent, while being heated until a homogeneous mass had formed and then poured into siliconized aluminium tubes. Curing was performed for 2 hours at 120° C. and then for 14 hours at 140° C.

In further Tests 4 and 5 the epoxy resin of Example 2 was fused together with 0.45 and 0.60 equivalent of phthalic anhydride for every epoxide equivalent with heating, then poured into aluminum tubes and cured first for 4 hours at 120° C., then for 14 hours at 150° C. and finally for 5 hours at 190° C.

The properties of the cured castings are shown in the following table:

|  | Test |  |  |  |  |
|---|---|---|---|---|---|
|  | 1 | 2 | 3 | 4 | 5 |
|  | Hexahydrophthalic acid anhydride | | | Phthalic acid anhydride | |
| Ratio equivalent anhydride groups to equivalent epoxide groups | 0.85 | 1.0 | 1.1 | 0.45 | 0.60 |
| Heat distortion point accdg. to Martens (DIN), in °C | 71 | 78 | 82 | 70 | 87 |
| Deflection,[1] in mm | 3.8 | 3.7 | 4.0 | 3.5 | 3.2 |
| Flexural strength (VSM), kg./mm.[2] | 8.0 | 8.5 | 9.0 | 8.5 | 7.4 |
| Impact strength (VSM), cm.-kg./cm.[2] | 7.0 | 9.5 | 9.8 | 7.9 | 6.4 |
| Water absorption after 4 days at 20° C., in percent | 0.47 | 0.45 | 0.45 | 0.59 | 0.60 |

[1] Deflection in mm., measured by the VSM bending test; test by measures 60 x 10 x 4 mm.

What is claimed is:
1. A diepoxide of the formula

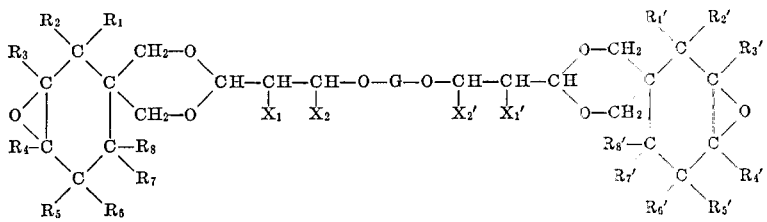

where $R_1$ to $R_8$ and $R_1'$ to $R_8'$ each are members selected from the group consisting of hydrogen or alkyl of 1 to 4 carbon atoms or together $R_1$ and $R_5$, and $R_1'$ and $R_5'$ respectively represent methylene; $X_1$, $X_1'$, $X_2$ and $X_2'$ each are members selected from the group consisting of hydrogen and methyl, and G is the residue obtained by removing two hydroxyl groups from glycerine.

2. A diepoxide of the formula

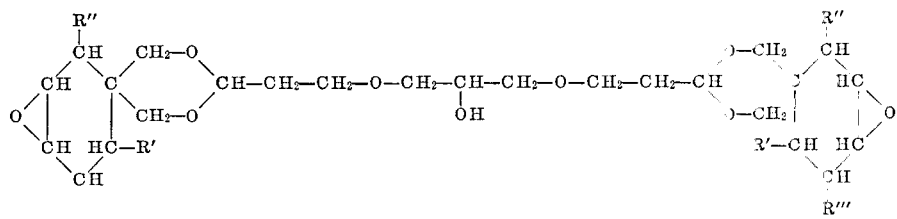

wherein $R'$ represents a member selected from the group consisting of hydrogen and methyl, and where $R''$ and $R'''$ each represent hydrogen and together $R''$ and $R'''$ represent methylene.

3. A diepoxide of the formula

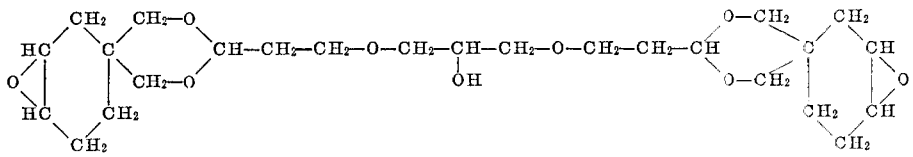

References Cited

UNITED STATES PATENTS 3,165,534   1/1965   Porret et al. _____ 260—340.7

ALEX MAZEL, Primary Examiner.

J. H. TURNIPSEED, Assistant Examiner.

U.S. Cl. X.R.

260—2, 30.4, 45.8, 830